US012632903B2

(12) United States Patent
Reed et al.

(10) Patent No.: US 12,632,903 B2
(45) Date of Patent: May 19, 2026

(54) INTEGRATED RATEMAKING PLATFORM

(71) Applicant: Allstate Insurance Company, Northbrook, IL (US)

(72) Inventors: Nicholas J. Reed, Round Lake, IL (US); Randy Senko, Northbrook, IL (US); Kevin Secler, Northbrook, IL (US); Venkat Gopalakrishnan, Aurora, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/621,913

(22) Filed: Mar. 29, 2024

(65) Prior Publication Data

US 2025/0307941 A1 Oct. 2, 2025

(51) Int. Cl.
G06Q 40/08 (2012.01)
G08B 21/18 (2006.01)

(52) U.S. Cl.
CPC ........... G06Q 40/08 (2013.01); G08B 21/182 (2013.01)

(58) Field of Classification Search
CPC .................................................... G06Q 40/08
USPC ............................................................ 705/4
See application file for complete search history.

(56) References Cited

U.S. PATENT DOCUMENTS

| | | | | |
|---|---|---|---|---|
| 8,577,699 B1 * | 11/2013 | Diener | .................. | G06Q 40/08 |
| | | | | 705/26.1 |
| 10,727,528 B2 | 7/2020 | Iguchi et al. | | |
| 11,658,353 B2 | 5/2023 | Iguchi | | |
| 2004/0024619 A1 * | 2/2004 | DiBella | .................. | G06Q 40/08 |
| | | | | 705/4 |
| 2010/0063851 A1 * | 3/2010 | Andrist | .................. | G06Q 40/08 |
| | | | | 705/4 |
| 2014/0278577 A1 * | 9/2014 | Baum | .................. | G06Q 40/08 |
| | | | | 705/4 |
| 2020/0058072 A1 * | 2/2020 | Riley | .................. | G06Q 40/08 |
| 2024/0169439 A1 * | 5/2024 | Farooq | .................. | G06Q 40/08 |

* cited by examiner

*Primary Examiner* — Robert R Niquette

(57) ABSTRACT

Implementations include an integrated ratemaking platform utilizing a common rating core that combines the functionality of an analytics rating engine and the production rating engine. Through the platform, one or more rating plans may be generated from rating plan configurations provided to the system, analyzed for performance, and utilized in response to a rating call received at the platform. The platform may include ratemaking analytics components to analyze and evaluate rating plans based on one or more business rules and production rating components to implement the evaluated rating plans. The various components may use a common data schema for sharing data. Certified rating plans may be promoted and published to the production rating components for use in generating the rate quotes from the certified rating plans.

20 Claims, 8 Drawing Sheets

Production Rating

Ratemaking Analytics

Rating Call

Data Enrichment

Ratemaking Database

Data Service

Rating Plan Configuration

Rating Plans

Rating Core

Production Rating Engine

Analytics Rating Engine

Ratemaking Measurement

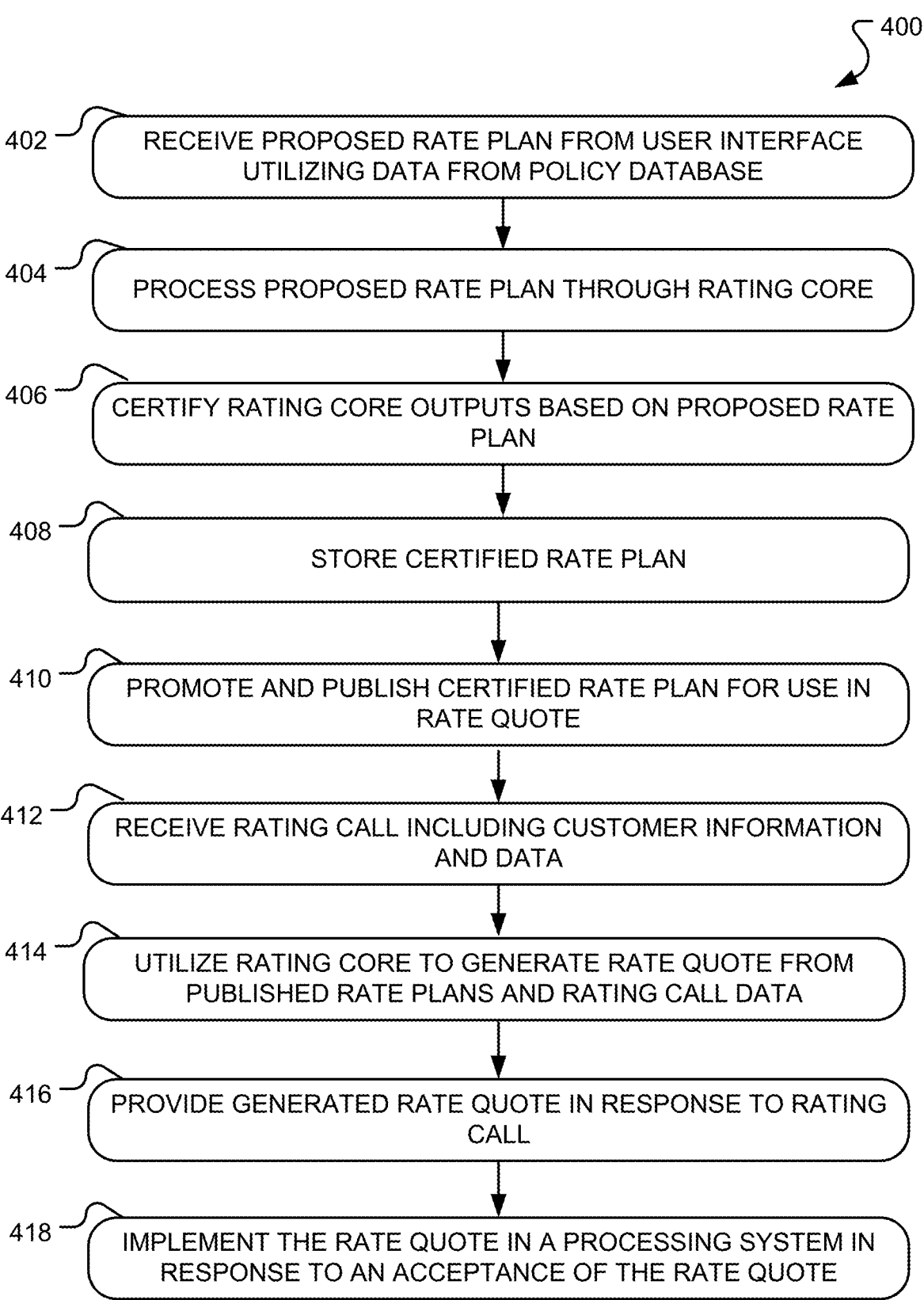

400

402 — RECEIVE PROPOSED RATE PLAN FROM USER INTERFACE UTILIZING DATA FROM POLICY DATABASE

404 — PROCESS PROPOSED RATE PLAN THROUGH RATING CORE

406 — CERTIFY RATING CORE OUTPUTS BASED ON PROPOSED RATE PLAN

408 — STORE CERTIFIED RATE PLAN

410 — PROMOTE AND PUBLISH CERTIFIED RATE PLAN FOR USE IN RATE QUOTE

412 — RECEIVE RATING CALL INCLUDING CUSTOMER INFORMATION AND DATA

414 — UTILIZE RATING CORE TO GENERATE RATE QUOTE FROM PUBLISHED RATE PLANS AND RATING CALL DATA

416 — PROVIDE GENERATED RATE QUOTE IN RESPONSE TO RATING CALL

418 — IMPLEMENT THE RATE QUOTE IN A PROCESSING SYSTEM IN RESPONSE TO AN ACCEPTANCE OF THE RATE QUOTE

FIG. 4

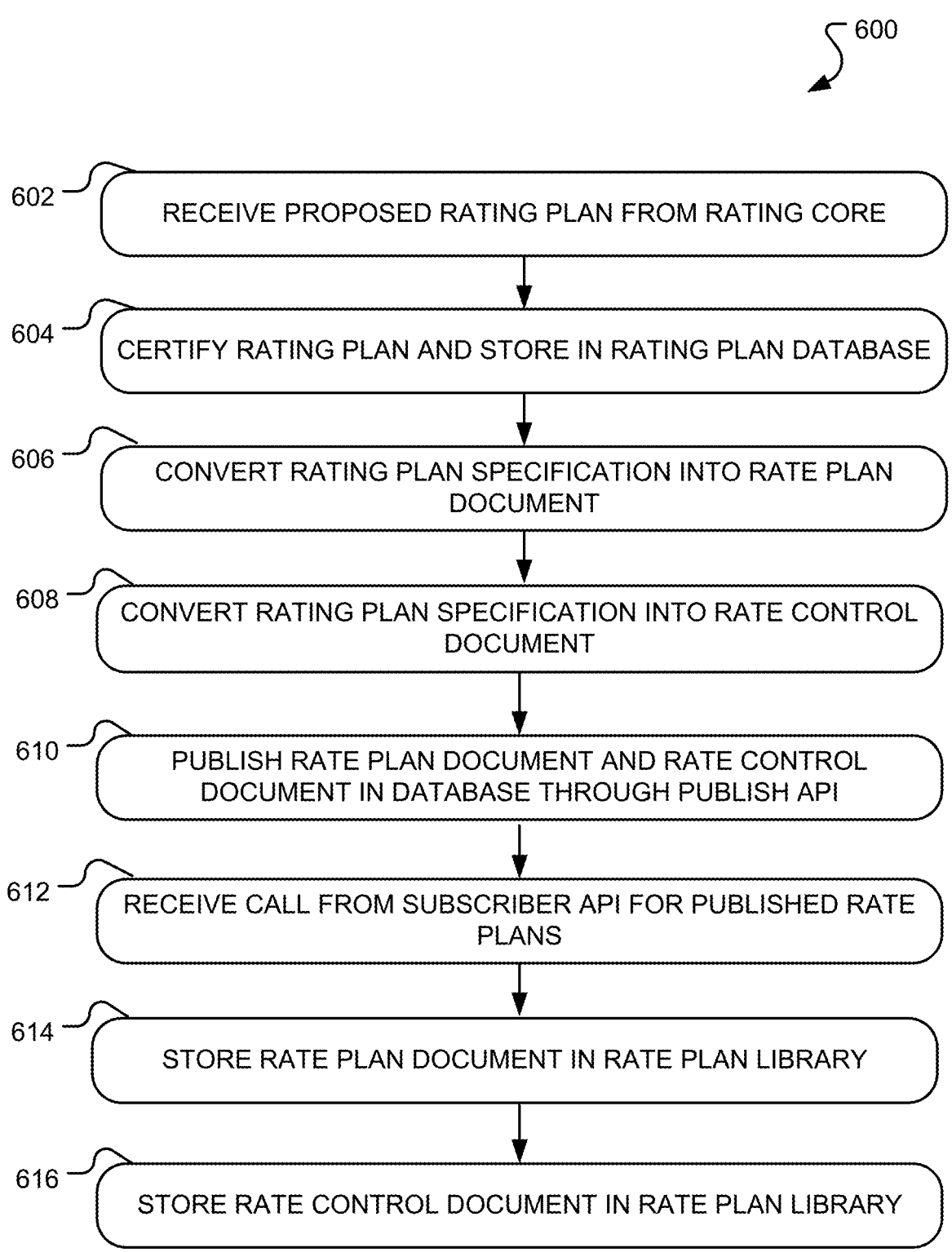

600

602 — RECEIVE PROPOSED RATING PLAN FROM RATING CORE

604 — CERTIFY RATING PLAN AND STORE IN RATING PLAN DATABASE

606 — CONVERT RATING PLAN SPECIFICATION INTO RATE PLAN DOCUMENT

608 — CONVERT RATING PLAN SPECIFICATION INTO RATE CONTROL DOCUMENT

610 — PUBLISH RATE PLAN DOCUMENT AND RATE CONTROL DOCUMENT IN DATABASE THROUGH PUBLISH API

612 — RECEIVE CALL FROM SUBSCRIBER API FOR PUBLISHED RATE PLANS

614 — STORE RATE PLAN DOCUMENT IN RATE PLAN LIBRARY

616 — STORE RATE CONTROL DOCUMENT IN RATE PLAN LIBRARY

FIG. 6

INTEGRATED RATEMAKING PLATFORM

TECHNICAL FIELD

Aspects of the present disclosure generally relate to systems and methods for ratemaking, and more specifically for an integrated ratemaking platform and ratemaking as an executable service.

BACKGROUND

Generally, "insurance" is an agreement by which an insurer, sometimes referred to as an underwriter, undertakes to indemnify the insured party against loss, damage, or liability arising from certain risks, in exchange for consideration. The consideration paid by an insured party is typically referred to as a "premium," which is paid to keep the insurance in effect. An "insurance policy" is a contract of insurance that defines the rights and duties of the contracting parties. A typical insurance policy includes limits on the amount of risk that the insurer will cover.

Insurance rates are typically determined through an actuarial process that uses data related to customer characteristics to determine differences in expected loss costs for different customers. Accordingly, the rate in an insurance policy reflects an estimate of the expected value of future costs, so techniques estimate future losses and costs to determine insurance rates. Increasingly, such processes are automated through a ratemaking process that uses customer data to generate a rate plan for that customer. In the insurance industry, a common practice for determining rates involves estimating future costs by looking at past loss-cost data for customers with similar data as a requesting customer. Different actuarial methodologies further improve the credibility of the ratemaking process by analyzing historically generated rate plans and a profit returned from the historical rate plans. By analyzing loss-cost data of a region over a number of years for a plurality of customers in the region, a company can estimate future exposure to risk more accurately by invoking mathematical methodologies that leverage the available customer and rate plan data.

It is with these observations in mind, among other, that aspects of the present disclosure were conceived.

SUMMARY

Implementations described and claimed herein address the forgoing by providing systems and methods for an integrated ratemaking platform. In one implementation, the ratemaking platform may include a processing device receiving a proposed rating plan comprising one or more parameters for generating a rate quote, a non-transitory database storing a plurality of rating plans, and a rating engine executing one of the plurality of rating plans with a plurality of rate quote parameters. The processing device may execute one or more instructions that cause the processing device to perform the operations of certifying the proposed rating plan by comparing a received output from the rating engine executing the proposed rating plan to a plurality of certification threshold values, receiving a rating call comprising one or more rate quote variables, and executing, using the one or more rate quote variables, the certified proposed rating plan in the rating engine to generate a rate quote in response to the rating call. The processing device may further transmit, over a network connection to a receiving device, the generated rate quote and implement, in response to receiving an acceptance of the generated rate quote, the generated in a processing system In another implementation, one or more tangible non-transitory computer-readable storage media storing computer-executable instructions for performing a computer process on a server of a network is described. The computer process may comprise the method of receiving, at a processing device, a proposed rating plan comprising one or more parameters for generating a rate quote, executing, at a ratings engine and utilizing a plurality of rate quote parameters, the proposed rating plan, and certifying the proposed rating plan by comparing a received output from the rating engine executing the proposed rating plan to a plurality of certification threshold values. The computer process may further comprise the method of receiving a rating call comprising one or more rate quote variables, executing, by the processing device and using the one or more rate quote variables, the certified proposed rating plan in the rating engine to generate a rate quote in response to the rating call, transmitting, over a network connection to a receiving device, the generated rate quote, and implementing, in response to receiving an acceptance of the generated rate quote, the generated in a processing system.

Another implementation may include a method for a ratemaking platform comprising the steps of receiving, at a processing device, a proposed rating plan comprising one or more parameters for generating a rate quote, executing, at a ratings engine and utilizing a plurality of rate quote parameters, the proposed rating plan, and certifying the proposed rating plan by comparing a received output from the rating engine executing the proposed rating plan to a plurality of certification threshold values. The method may further comprise the steps of receiving a rating call comprising one or more rate quote variables, executing, by the processing device and using the one or more rate quote variables, the certified proposed rating plan in the rating engine to generate a rate quote in response to the rating call, transmitting, over a network connection to a receiving device, the generated rate quote, and implementing, in response to receiving an acceptance of the generated rate quote, the generated in a processing system.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 4 depicts a method for utilizing an integrated ratemaking platform to obtain approved rate plans for use in generating a rate quote based on a rating call.

FIG. 6 depicts a method for promoting and publishing a certified rating plan to a rating plan library of an integrated ratemaking platform.

DETAILED DESCRIPTION

Figure 1:
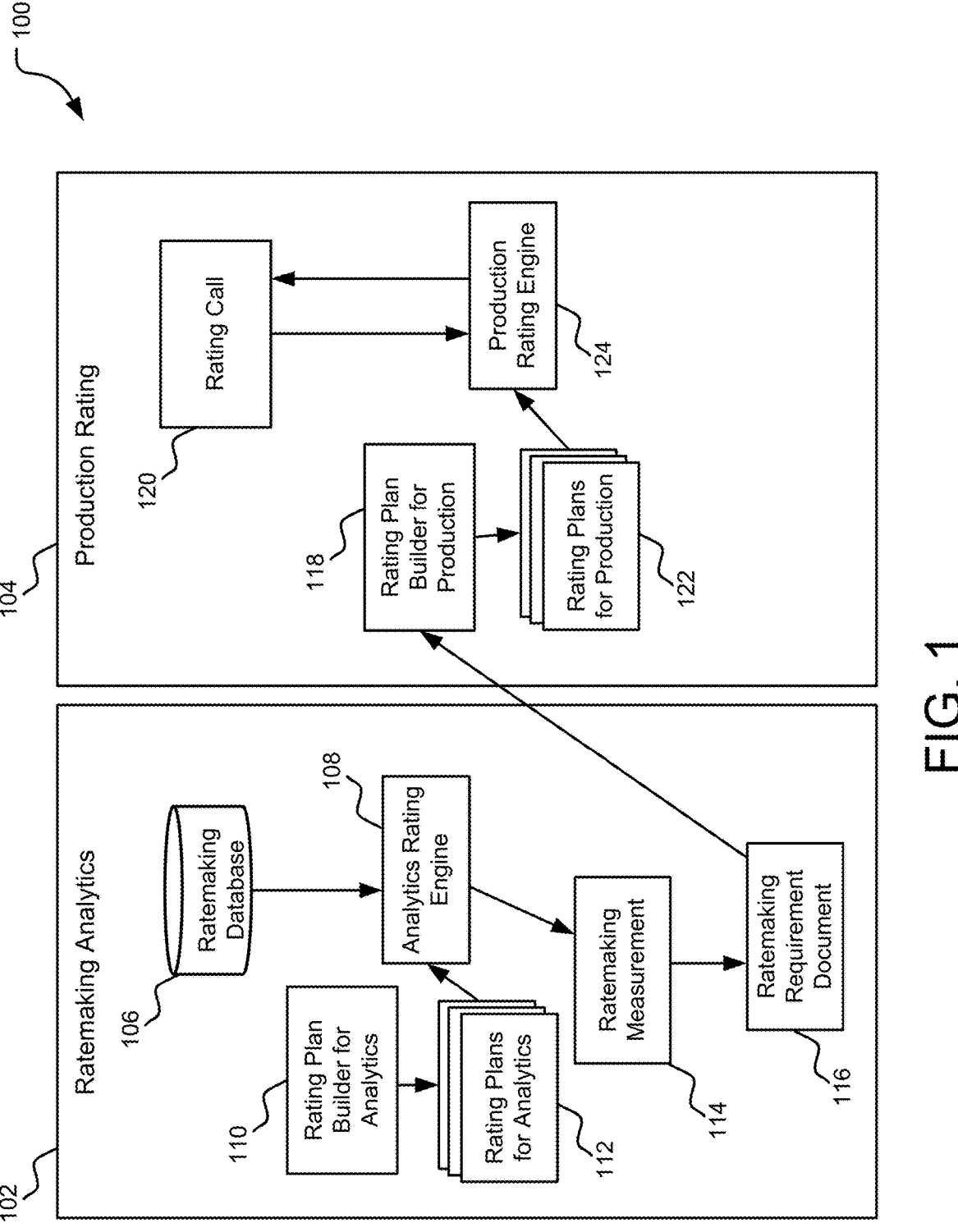
FIG. 1 depicts an illustrative first operating environment for providing a ratemaking platform.

FIG. 1 depicts an illustrative operating environment 100 in accordance with aspects of the disclosure. The environment 100 illustrates a traditional ratemaking system that may be utilized to generate one or more rate plans based on customer data and/or analytics of historical rate plan performance. Generally speaking, the process of ratemaking or creating generalized rate plans (i.e., "ratemaking analytics" 102) is often kept separate from the process of providing a rate plan based on a specific customer request (i.e., "production rating" 104). In particular and as illustrated in FIG. 1, the ratemaking analytics system 102 may generate one or more approved rate plans through a computational analysis of historical rate plan performance and other factors. As generalized rate plans are determined to satisfy one or more business requirements, the generalized rate plans may be provided to a production rating system 104. The production rating system 104 may receive one or more requests or "calls" for a specific rate plan for a customer, based in part on customer data. More particularly, data related to a policy requested for the customer may be utilized to select or determine a specific rate plan for the customer from the generalized rate plans from the ratemaking analytics system 102. However, the separate ratemaking analytics system 102 and production rating system 104 may include several redundancies, inefficiencies, and undesired costs, as explained in greater detail below.

At a high level, the ratemaking analytics system 102 analyze a simulated performance of generated rate plans 112 to determine a performance of the rate plan based on historically generated rate plans. In particular, a rating plan builder 110 for the analytics system 102 may be used to generate one or more rate plans 112 for analysis. In one implementation, a user may utilize the rating plan builder 110 to generate a rate plan 112 for analysis. In another implementation, the rating plan builder 110 may automatically generate a rate plan 112 through one or more processes, including through an artificial intelligent (AI) or machine learning process. The generated rate plans 112 may be provided to an analytics ratings engine 108 for processing with data obtained from a ratemaking database 106. The ratemaking database 106 may include any information or data processed by the generated rate plans 112. For example, the ratemaking database 106 may include historical rate plans, policy information or data, generalized customer data, and/or any other information or data that may be provided as an input to one or more of the generated rate plan 112. In one implementation, the ratemaking database 106 may store anonymous customer information from previously provided rate plans, historical rate plan performance, and one or more business rules for evaluating the performance of a generated rate plan 112. The analytics rating engine 108 may provide the performance of the generated rate plans 112 to a ratemaking measurement system 114 to quantify the performance of the rate plans 112. For example, the ratemaking measurement system 114 may generate one or more outputs indicating the profit obtained from the rate plan based on the inputs provided from the ratemaking database 106. In general, the ratemaking measurement system 114 may determine any performance metric for one or more of the rate plans 112 to quantify the performance of the rate plan in comparison to other plans.

In addition to determining the performance of the one or more rate plans 112, the ratemaking analytics system 102 may generate one or more ratemaking requirement documents 116 for use by the production rating system 104. In particular, rate plans 112 that exceed a performance threshold, as determined by the ratemaking measurement system 114, may be converted into a viable rate plan for use by customers to the production rating system 104. Those rate plans 112 that do not exceed the performance threshold as determined by the ratemaking measurement system 114 may be discarded or returned to the rating plan build 110 for further refinement. Thus, the analytics system 102 may analyze and determine which generated rate plans 112 satisfy the business-performance thresholds and provide those qualifying rate plans to the production rating system 104 for use with customers to the system.

Those rate plans 112 generated by the ratemaking analytics 102 that exceed the performance threshold may be provided to the production rating system 104, and in particular, the rating plan builder 118 for the production system. In many instances, however, the rating plan builder 110 for the ratemaking analytics 102 may generate the rate plans using a particular schema, such as a structured data schema that is conducive for analysis of rate plan performance. However, rate plans 122 of the production rating system 104 may use an unstructured data schema as unstructured data of the generated rate plan is more conducive to production application of the rate plans. In particular, rating plan builder 118 for the production rating system 104 may receive the ratemaking requirement documents 116 from the ratemaking analytic system 102 and recode the information in the documents into one or more rate plans 122 for the production rating system 104. In one implementation, the rating plan builder 118 for the production rating system 104 may convert the ratemaking requirement documents 116 from a structured data schema to an unstructured data schema for the rate plans 122 for the production rating system. The production rating system 104 may also receive a rating call 120 from one or more users or systems to generate a specific rate quote for a customer or other user of the system. The rating call 120 may include data utilized in generating the specific rate quote, such as customer information, location information, previous rate plans for the customer, and the like. The information and data included in the rating call 120 may be provided to the production rating engine 124 for processing to determine a rate quote based on the information in the rating call and the approved rating plans 122 for the production rating system 104. In some instances, the production rating engine 124 operates in a similar manner as the analytics rating engine 108. However, as the production ratings system 104 utilizes a different data schema as the ratemaking analytics system 102, the rating engine 124 for the production rating system may be configured to process the data of the rating call 120 corresponding to the production rating system. In one implementation, the production rating engine 124 may apply the data received from the rating call 120 to the one or more generated rate plans 122 to obtain a rate quote in response to the rating call 120. Thus, the determined rate quote may be based on the information provided in the rating call 120 and tailored to the customer information included in the rating call. In this manner, those rate plans that exceed the performance thresholds as determined by the ratemaking analytics system 102 may be utilized by the production rating system 104 to provide rate quotes in response to a rate call 120 received at the production rating system.

Figure 2:
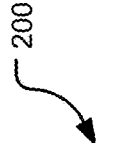
FIG. 2 depicts an illustrative second operating environment for providing a ratemaking platform utilizing an integrated rating core and common schema.

Referring now to FIG. 2, an illustrative second operating environment for providing a ratemaking platform utilizing an integrated rating core and common schema is illustrated. Generally, the environment 200 of FIG. 2 combines aspects of the ratemaking analytics system 102 and the production rating system 104 of FIG. 1 to reduce redundant systems, inefficiencies, and extra costs to provide a more streamline and efficient approach to ratemaking. For example, this integrated ratemaking platform 200 utilizes a common rating core 214 that combines the functionality of the analytics rating engine 108 and the production rating engine 124 into a single rating core. In this configuration, one or more rating plans 210 may be generated from rating plan configurations 208 provided to the system. As above, the rating plan configurations 208 may be generated from user inputs or may be automatically generated from one or more computational algorithms utilizing AI or machine-learning techniques. Regardless of the type of rating plan configuration 208, one or more rating plans 210 may be generated for use by the rating core 214 for both ratemaking analytics and production rating.

The environment 200 may include ratemaking analytics components to analyze and evaluate rating plans 210 based on one or more business rules. In particular, the generated rate plans 210 may be provided to the rating core 214 for processing data obtained from a ratemaking database 206. As above, the ratemaking database 206 may include any information or data used by the rating core 214 to process the generated rate plans 210. For example, the ratemaking database 206 may include historical rate plans, policy information or data, generalized customer data, and/or any other information or data that may be provided as an input to one or more of the generated rate plan 210. In one implementation, the ratemaking database 206 may store anonymous customer information from previously provided rate plans, historical rate plan performance, and one or more business rules for evaluating the performance of a generated rate plan 210. Also as above, an analytics rating engine 218 aspect of the rating core 214 may provide the performance of the generated rate plans 210 to a ratemaking measurement system 212 to quantify the performance of the rate plans, such as to determine a profit of the rating plans over the lifespan of the rating plan and for different outcomes. In general, the ratemaking measurement system 212 may determine any performance metric for one or more of the rate plans 210 to quantify the performance of the rate plan in comparison to other plans.

The operating environment 200 may also perform one or more production rating aspects of the ratemaking process. For example, a rating call 220 may be received from one or more users or systems to generate a specific rate quote for a customer or other user of the system. The rating call 220 may include data utilized in generating the specific rate quote from the rating plans 210, such as customer information, location information, previous rate plans for the customer, and the like. In the example illustrated in FIG. 2, the information and data included in the rating call 220 may be provided to the production rating engine 216 portion of the rating core 214 for processing to determine a rate quote. However, in this environment 200, the analytics rating engine 218 and the production rating engine 216 may be aspects of the same rating core 214 engine such that two separate rating engines are not needed in the integrated ratemaking platform 200 of FIG. 2. This configuration thereby minimizes or reduces the handoffs between the ratemaking analytics and the production rating sides of the ratemaking process.

As noted, determining ratemaking analytics may use a particular schema that generally includes a structured data schema that is conducive for analysis of rate plan performance while production rating systems generally utilize an unstructured data schema for generating a rate quote from the rating plans 210. To facilitate the use of a single rating core 214 between the ratemaking analytics system and the production rating system, one or more additional components may be included with the integrated ratemaking platform 200. For example, a data enrichment 204 service may be instantiated within the platform 200 to convert all of the data utilized by the rating core 214 (and other components of the platform) into one common schema. The data enrichment service 204 may receive data from rating call 220 and/or the ratemaking database 206 and alter the data into an unstructured data schema. In one implementation, the integrated ratemaking platform 200 may utilize JavaScript Object Notation (JSON) data interchange format, although any unstructured data schema is contemplated. In addition to the data enrichment service 204, a data service 202 may also be included between the rating core 214 and the ratemaking database 206. The data service 202 may be configured to convert data obtained from the ratemaking database 206 into the unstructured data schema of the integrated ratemaking platform 200, including but not limited to, generating parent-child relationships of the data stored in the database. The data may further be enriched or otherwise altered by the data enrichment service 204 before being provided to the rating core 214 for processing by the engines of the rating core. In this manner, the ratemaking analytics and production rating systems may utilize the same rating core 214 to analyze the performance of the generated rate plans 210 and to provide specific rate quotes based on a rating call 220 without the need to convert rating plans into different data schemas. Rather, the integrated ratemaking platform 200 may utilize a common data schema, generate one rate plan between the two systems, and reduce the handoffs and/or communications between the systems as illustrated above in the system 100 of FIG. 1.

Figure 3:
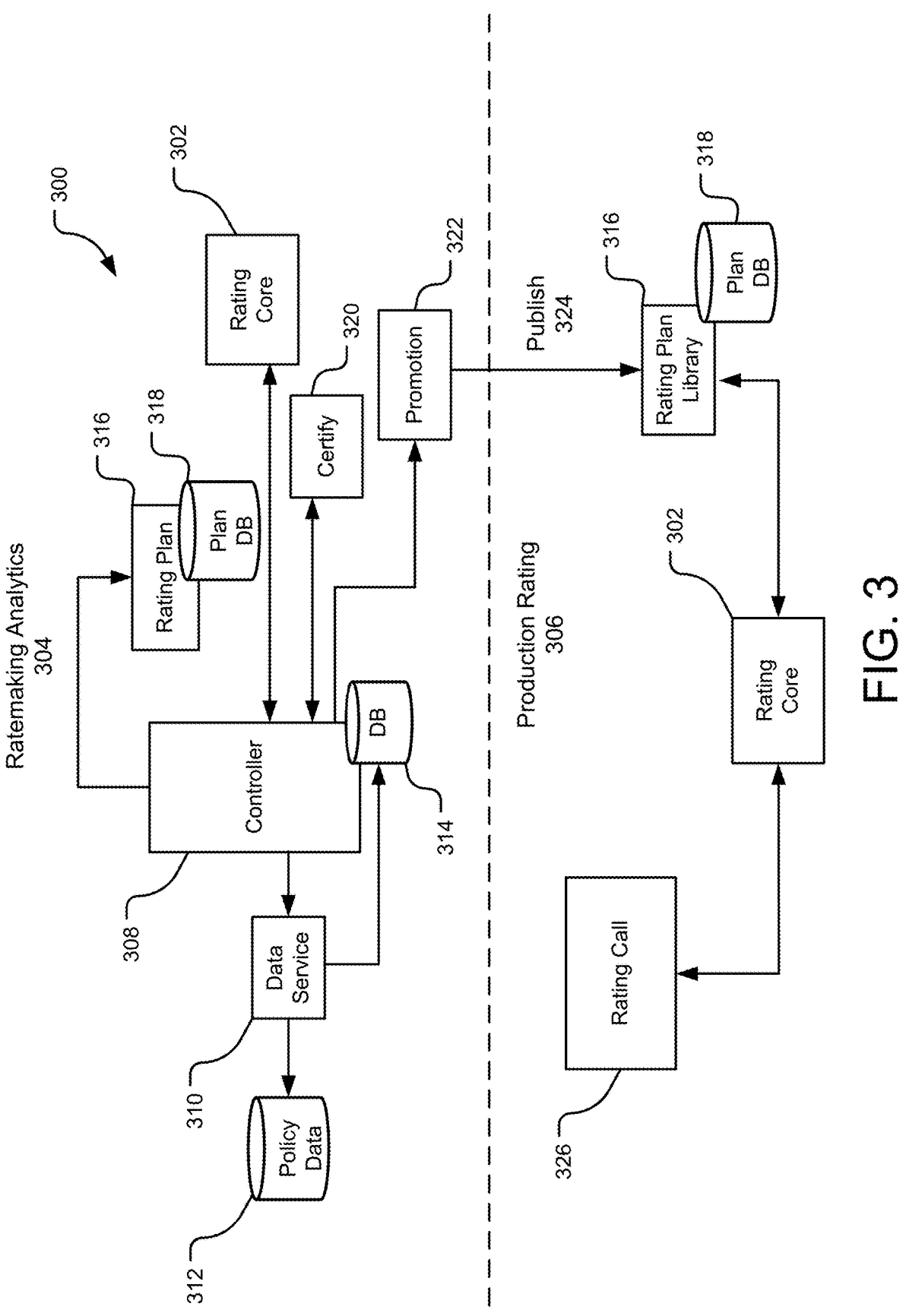
FIG. 3 depicts an illustrative integrated ratemaking platform for analyzing rating plans and providing rate quotes based on the rating plans.

FIG. 3 depicts an illustrative integrated ratemaking platform 300 for analyzing rating plans and providing rate quotes based on the rating plans. Many of the components of the platform 300 illustrated in FIG. 3 are the same or similar to the components described above with relation to the platform 200 of FIG. 2. For example, the rating core 302 of the integrated ratemaking platform 300 may be the same rating core 214 illustrated in FIG. 2. As such, some aspects of the functionality of the components of the integrated ratemaking platform 300 are discussed above and may apply to the components described here. The integrated ratemaking platform 300 is provided in FIG. 3 to illustrate the operational steps of the integrated ratemaking platform to provide ratemaking analytics 304 and production rating 306 from a unified rating core and taking advantage of the common schema between the two systems. To aid in illustration, FIG. 4 is a method for utilizing an integrated ratemaking platform 300 to obtain approved rate plans for use in generating a rate quote based on a rating call, wherein the rate plans are analyzed for performance based on historical rate plan production. In many instances, the operations or steps of method 400 may be performed automatically by one or more components of the integrated ratemaking platform 300. For example, the controller may 308, upon receiving instructions to generate a rating plan, execute the steps described herein. As further explained below, one or more of the steps may be executed by a machine-learning method executed by the controller 308 or other computing device to update and improve the ratemaking process of the integrated ratemaking platform 300.

The process may begin at step 402 when a proposed rate plan is received from the controller 308. For example, the controller 308 may be controlled to generate a proposed rating plan using data stored by the integrated ratemaking platform 300. The controller 308 may be accessed by a computing device or controller to generate the rating plan. In one implementation, the generated rating plan may be based on policy data or other business rules providing parameters, thresholds, limits, and other configuration requirements for a proposed rating plan. For example, the policy data 312 may include one or more products offered by an insurance company for coverage including in a rating quote. The policy data 312 may therefore include information associated with available products and corresponding rates for providing said products, including region-specific data. Policy data 312 may also include estimated returns or profits for providing said products, actuarial tables, demographic information and data, historically generated rate plans, performance of historical rate plans, and the like. In general, the policy data 312 may be any data utilized to generate a rate plan for the integrated ratemaking platform 300.

The call to obtain the policy data 312 for generating a rate plan may be transmitted to a data service 310. The data service 310 may be configured to obtain the requested policy data 312 and convert the policy data into a common schema for use by the integrated ratemaking platform 300. In one implementation, the common schema may include unstructured data, such as a JSON data schema. The data service 310 may access the policy database 312 to obtain the data stored therein, convert the obtained data into the common schema for the integrated ratemaking platform 300, and store the converted data in a controller database 314. The controller 308 may have access to the controller database 314 to obtain the policy data in the common schema for the integrated ratemaking platform 300.

With the data from the controller database 314, the controller 308 may generate the proposed rate plan. As mentioned, the rate plan may be generated by the controller 308 as manipulated or controlled by a computing device or controller of the controller. As explained in more detail below, the rating plan may include a rate plan specification that includes a list of products, conditions, rates, ranges of variables, rate factors, user variables, user data, historical data, etc. In general, a rate plan provides a set of instructions for execution by the rating core 302 to generate a rate quote based on the information included in the rate plan, including costs, coverages, and/or variables of a rate quote and information included in a rating call 326, such as customer information and requested policies. Before the generated rating plan is made available for generating a rate quote, the rating plan may be processed by the rating core 302 at step 404 and certified at step 406. More particularly, the controller 308 may provide the proposed rating plan generated from the data in the database 314 to the rating core 302. The rating core 302 may simulate the rating plan by executing the instructions of the rating plan with one or more generalized variables. The simulation of the rating plan by the rating core 302 may therefore be similar to the operations of the rating core when providing a rate quote in response to a rating call 326. Further, the rating core 302 may be configured to utilize the same common schema in which the rating plan is configured such that the ratemaking analytics 304 and the production rating 306 systems may utilize the same rating core.

The rating core 302 may provide an output of one or more rate quotes based on the proposed rating plan as simulated. The outputs of the rating core 302 may also include one or more performance metrics of the proposed rating plan for use in certifying the rating plan at step 406. In particular, the outputs of the rating core 302 may be returned to the controller 308 which may apply one or more certification processes 320 to the proposed rating plan based on the rating core 302 outputs. For example, the controller 308 may compare the output of the rating core 302 of the proposed rating plan to the performance of one or more historical rating plans to determine a performance of the proposed rating plan. The historical rating plans and/or performance of historical rating plans may be obtained from a storage device, such as 318 discussed in more detail below. In another example, the controller 308 may compare an estimated profit generated from the proposed rating plan to a profit threshold of the certification process 320. In general, the certification process 320 may include one or more thresholds, parameters, or values to which the output of the rating core 302 may be compared to estimate a performance of the proposed rating plan as evaluated by the rating core. The thresholds, parameters, or values of the certification process 320 may be based on any performance metric of a rate quote and may further be based on one or more business rules. In still further examples, the certification process 320 may include returning a failure notification if the proposed rating plan fails any aspect of the certification process. The failure notification may be provided by the controller 308 to a computing device or user of the controller that generated the proposed rating plan.

In some instances, the controller 308 may automatically alter the proposed rating plan based on the failure of certification notification received at the controller. For example, the failure notification in response to the certification 320 failure may include an indication of the one or more certification thresholds the proposed rating plan failed. The controller 308, in response to the failure notification, may execute a machine-learning algorithm or artificial intelligent algorithm to alter one or more aspects of the proposed rating plan. The alteration to the proposed rating plan may be based on one or more historical rating plans and results of the certification process of the one or more historical rating plans. For example, a proposed rating plan may fail a first certification requirement needed to certify the rating plan. The controller 308 may receive the failure notification of the certification of the proposed rating plan, which may include an indication that the proposed rating plan failed the first certification requirement. The controller 308 may then access previous rating plans and certification results to determine a possible adjustment to the proposed rating plan to satisfy the first certification requirement. However, adjusting the proposed rating plan in response to the failure of the first certification requirement may cause the rating plan to fail a second certification requirement. Upon receiving a notification that the certification failed for the proposed rating plan based on the second certification requirement, the controller 308 may again access a historic rating plan and certification result to further adjust the proposed rating plan. This process may continue automatically until the rating plan is certified. In addition, the algorithm executed by the controller 308 to adjust and/or update the rating plan may also be adjusted based on the results of the certification process. For example, an adjustment to the proposed rating plan may cause the rating plan to become certified. The adjustment algorithm of the controller 308 may apply a weighted value within the algorithm to the alteration of the proposed rating plan that results in a positive certification. Similarly, the adjustment algorithm of the controller 308 may apply a negative weighted value within the algorithm to the alteration of the proposed rating plan that results in another failed certification. In this manner, the machine-learning algorithm or artificial intelligent algorithm of the controller 308 may learn from past successes and failures in the adjustment of the proposed rating plans to improve the performance of the algorithm.

Rating plans 316 that are certified by the controller 308 may be stored in the plan database 318 for use by the ratemaking analytics 304 and/or production rating 306 systems at step 408 of method 400. In one implementation, the rating plan database 318 may be a structured query language (SQL) relational database storing any number of generated and certified rating plans 316. Further, the rating plans 316 may be stored using the common data schema of the other databases and processes of the integrated ratemaking platform 300. In some instances, the rating plans 316 of the rating database 318 may include any proposed rating plan generated by the controller 308, including rating plans that have not been certified 320 by the integrated ratemaking platform 300. These un-certified rating plans may be utilized by the controller 308 to generate additional proposed rating plans and/or to certify additionally proposed rating plans. In general, the controller 308 and rating plans database 318 may store any number of historical rating plans for use in the generation of additionally proposed plans.

Certified rating plans may also be promoted to the production rating system 306 and published at step 410. In some instances, the proposed rate plan may not be stored in the rating plan library 316 without first being promoted 322 and published 324 by the integrated ratemaking platform 300. The promotion and publication processes are discussed in more detail below with reference to FIGS. 5 and 6. Once published, however, a rating plan may be stored in the rating plan library 316 for use in generating a rate quote.

To generate a rate quote using a published rating plan, the integrated ratemaking platform 300 may receive a rating call 326 at step 412. The rating call 326 may include data utilized in generating the rate quote, such as customer information, location information, previous rate plans for the customer, and the like. The information and data included in the rating call 326 may be provided to the rating core 302 for processing to determine a rate quote based on the information in the rating call. The rating core 302 may be in communication with and utilize the rating plan library 316 of published rating plans stored in the plan database 318. In particular, the rating core 302 may execute one or more of the published rating plans utilizing the data of the rating call 326 as an input to the rating plans at step 414. The rating core 302 may provide a rate quote output based on the rating plans 316 and the rating call 326 at step 416. The rate quote may, therefore, satisfy the one or more certification processes 320 and business rules of the integrated ratemaking platform 300. The rate quote may then be provided to a user in response to the rating call. In some instances, the rate quote may be transmitted to a receiving device associated with the rating call 326. In other instances, the rate quote may be provided to any computing device, such as a mobile device of a user or agent, a web server for display on a display device, an aggregation service combining rate quotes from a plurality of ratemaking systems, and the like. In one example, a server hosting a website may receive a request for a rate quote and generate and provide the rating call 326 to the integrated ratemaking platform 300. The rate quote may include information about a rate plan for a particular user based on one or more of the rating plans of the library 316. Once generated, the rate quote may be provided to the server for display within the website through which the request for the rate quote was received. In another example, an email may be generated that includes an embedded link to a website through which the rate quote may be obtained. For example, the email may include a Uniform Resource Locator (URL) that is clickable or otherwise selectable through an input to the email. The URL link may cause a computing device to open a browser application and direct the application to a website associated with the link. The browser of the computing device may further transmit one or more messages to a server from which the contents of the website, including the rate quote, may be obtained for display within the browser application. In this manner, the generated and transmitted email may provide access to the generated rate quote through an associated website. In general, the rate quote based on the rating plans 316 may be transmitted to any receiving device by the integrated ratemaking platform 300.

At step 418, a response to the rate quote may be received indicating an acceptance of the provided rate quote. For example, a selection of the rate quote may be received at the server hosting the website that indicates an acceptance of the rate quote. The server or other computing device, including the integrated ratemaking platform, may implement the rate quote in a processing system. For example, a customer may be established within the processing system based on the rate quote. One or more billing systems may be activated to implement the rate quote for the customer. In some instances, a payment system may process a payment based on the rate quote. In addition, one or more notification systems may be initiated that notify a customer of the accepted rate quote. Other systems may also be initiated as part of the implementation of the indication of the acceptance of the rate quote. In general, any processing system associated with processing of a rate quote may be initiated, updated, altered, etc. based on receiving an acceptance of the rate quote. Further, the acceptance of the rate quote may be received via a network from any computing device associated with providing the rate quote, including a mobile device, web server, personal computing device, and the like. Implementation of the rate quote may also include updating of one or more databases with additional customer information and/or payment options for the customer, as well as storing and processing of past and future payments defined by or otherwise associated with the rate quote.

As should be appreciated, the integrated ratemaking platform 300 provides several benefits over previous ratemaking systems that maintain the ratemaking analytics and the production rating into separate systems. Rather, the integrated ratemaking platform 300 includes a single rating core between the two systems that minimizes or otherwise reduces the handoffs between the ratemaking analytics and the production rating sides of the ratemaking process as each aspect of the platform may utilize and call the same rating core 302. Further, the integrated platform 300 may utilize a common data schema for both the analytics of the rating plans 316 and for producing rate quotes from the certified rating plans. The use of the common schema also removes a need to rewrite certified rating plans into a schema used by the production rating system such that all aspects of the integrated ratemaking platform 300 may utilize the certified rating plans for both analytics and/or production.

Figure 5:
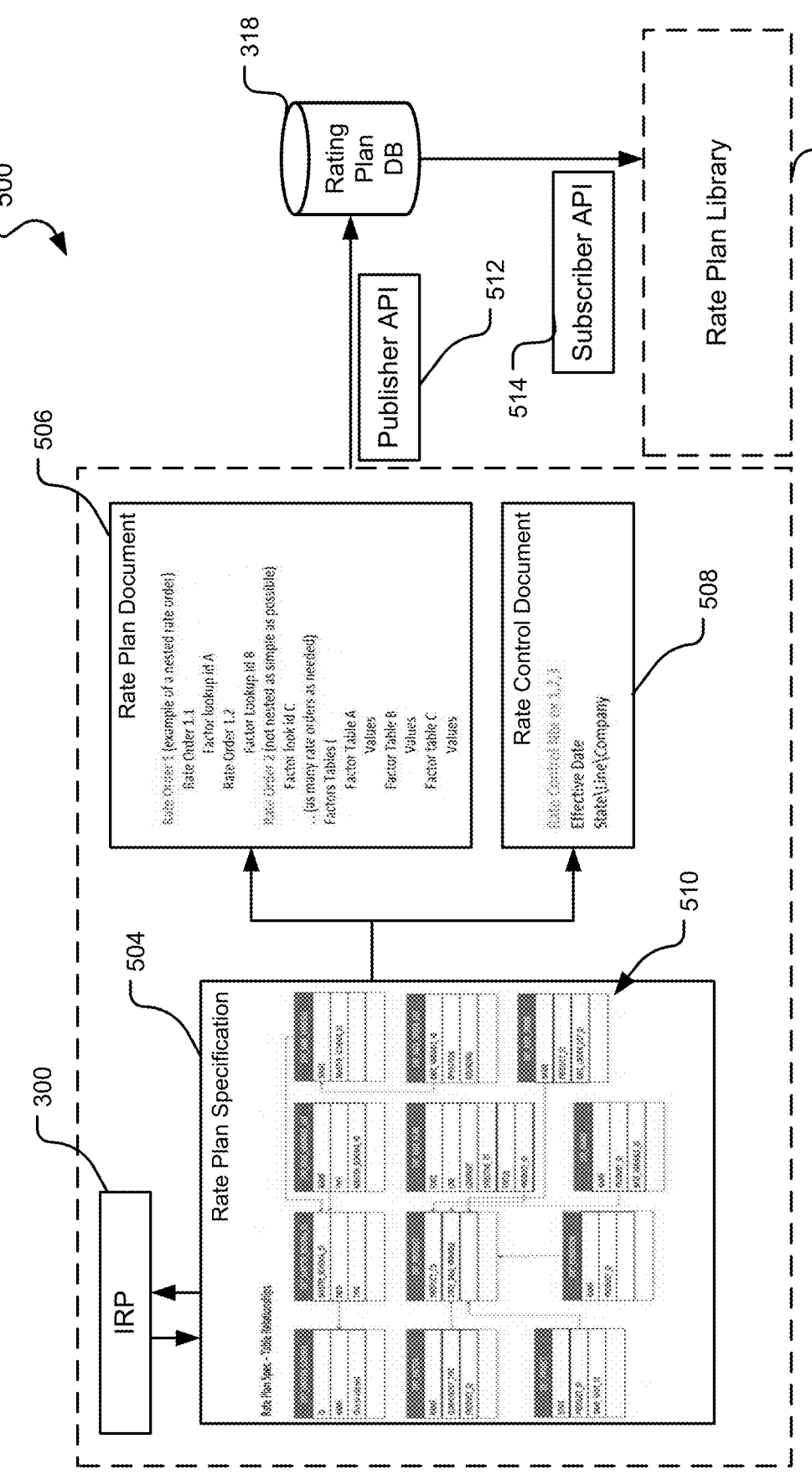
FIG. 5 depicts an illustrative operating environment for promoting and publishing a certified rating plan to a rating plan library.

As mentioned above, the integrated ratemaking platform 300 may promote and publish certified rating plans into a rating plan library 316 for use in producing a rate quote through a promotion 322 and publishing process 324. FIG. 5 depicts an illustrative operating environment 500 for promoting and publishing a certified rating plan to a rating plan library. Through the environment, one or more proposed rating plans may be published to a rating plan database and made available for use by the integrated ratemaking platform 300 in response to a rating call 326. FIG. 6 depicts a method 600 for the promotion and publishing of a certified rating plan to a rating plan library of an integrated ratemaking platform 300. As explained above, the promotion and publishing of a rating plan may bridge the ratemaking analytic system and the production rating system of the integrated ratemaking platform. The operations of the operating environment 500 are therefore described herein with relation to the steps of the method 600 of FIG. 6, although it should be appreciated that the environment may include more or fewer components as depicted and/or the promoting and publishing process may include more or fewer steps than described herein. Also, as above, the operations or steps of method 600 may be performed automatically by one or more components of the integrated ratemaking platform 300. For example, the controller 308 may, upon receiving an indication of a proposed rating plan, execute the steps described herein. As further explained below, one or more of the steps may be executed by a machine-learning method executed by the controller 308 or other computing device to update and improve the ratemaking process of the integrated ratemaking platform 300.

At step 602, a proposed rating plan may be received from one or more components of the integrated ratemaking platform 502. For example and with reference to the ratemaking platform 300 of FIG. 3, the controller 308 may provide a rating plan generated by the rating core 302 for promotion 322 following a certification of the rating plan. The operations for receiving the rating plan from the rating core 302 and certifying the rating plan are described above. As illustrated in FIG. 5, the rating plan may include a rate plan specification 504 comprising a plurality of primary values and associated secondary values arranged in tables 510. In one particular implementation, the rate plan specification may be in an SQL based schema. The tables 510 of the rate plan specification 504 may include inter-relationships or be otherwise nested such that entries in some tables may point to other tables, which may in turn include variables that may point to other tables, and so on. The variables in the tables 510 of the rate plan specification 504 may be provided by the proposed rate plan of the controller 308 of the integrated ratemaking platform 300. For example, a computing device may utilize the controller 308 to generate one or more parameters defining a rating plan from which the tables 510 and inter-relationships of the tables may be generated by the controller to create the rate plan specification 504. In general, however, the rate plan specification 504 may take any type of a data schema that includes inter-relationships between the variables of the rating plan.

At step 604, the proposed rating plan may be certified and stored in a rating plan database, as described above with relation to FIGS. 3 and 4. Once certified, the rating plan may be converted from the rate plan specification 504 to a rate plan document 506 and a rate control document 508. To convert the rating plan to a rate plan document 506 at step

606, the data and relationships of the tables 510 of the rate plan specification 504 may be converted into one or more nested orders of the variables. For example and as shown in FIG. 5, the rate plan document 506 may include a nested rate order comprising an executable instruction (or "rate order") and one or more factors corresponding to the instruction that determine when or if the instruction is executed by the rating core 302 during a production rating. In addition, the rate plan document 508 may include factors or instructions that are not nested. Instructions or factors that are not nested generally include data that is not dependent on a condition or state of another variable or factor as included in the rate plan specification 504. Thus, conversion of the rate plan specification 504 into a rate plan document 506 may include ordering the factors, variables, and other data of the specification into one or more executable instructions. In general, the rate plan document 506 may include instructions executable by the rating core 302 to generate a rate quote from data included in a rating call 326. For example, the rating call 326 may include variables and/or data that, when applied to the rate plan document 506, cause the rating core 302 to generate a rate quote that is based on the information included in the rating call. As the instructions of the rate plan document 506 are generated from the tables 510 of variables and relationships of the certified rate plan specification 504, the rate quote may also be considered certified by the integrated ratemaking platform 300. In this manner, a certified rating plan may be automatically converted into executable instructions for the rating core 302 to generate a rate quote.

In addition to the rate plan document 506, the rate plan specification 504 may be converted into a corresponding rate control document 508 at step 608. In general, the rate control document 508 includes information or metadata about the generation of the proposed rating plan and/or rate plan specification 504. For example, the rate control document 508 may include a rate control or version number of the rating plan, an effective date of the rating plan, one or more variables or information associated with the rating plan (such as a particular state to which the rating plan applies, a company to which the rating plan may be associated, etc.), and the like. The rate control document 508 may be utilized by the integrated ratemaking platform 300 to manage the rating plans stored in the rate plan library 316. For example, the rating plans may expire after a specified amount of time as determined by the data in the rate control document 508. In another example, a rate control document 508 with a higher version number may replace document with a lower version number. In this manner, the rate control document 508 may include data or information from the rate plan specification that is not otherwise included in the executable instructions of the rate plan document 506.

At step 610, the rate plan document 506 and the rate control document 508 may be associated together and published to a database 318 via a publish application programming interface (API) 512. In particular, the integrated ratemaking platform 300 may call or otherwise execute a publisher API 512 to store the converted rate plan document 506 and/or the rate control document 508 together in the rating plan database 318. Once published, the rate plan document 506 and/or the rate control document 508 may be available for use by the rating core 302 as described above. Moreover, one or more components of the ratemaking platform 300 may subscribe to the rating plan database 318 through a subscriber API 514. The subscriber API 514 may be configured to monitor the rating plan database 318 for newly stored rate plan documents 506 and/or the rate control documents 508. When a new rate plan document 506 and/or the rate control document 508 is stored, the subscriber API 514 may notify those subscribed components at step 612. In one implementation, the rate plan library 316 may subscribe to the rating plan database 318 through the subscriber API 514 and receive a notification of a newly published rating plan available via the rating plan database. The rate plan library 316 may then utilize the newly published rate plan document 506 and/or the rate control document 508 in response to a rating call. More particularly, the rate plan document 506 may be obtained from the database 318 at step 614 and stored with the rate plan library 316. In one implementation, the rate plan document 506 may be stored at the rate plan library 316 (and the rating plan database 318) as a JSON document. In a similar manner, the rate control document 508 may be obtained from the database 318 at step 616 and stored with the rate plan library 316. In one implementation, the rate control document 508 may be stored at the rate plan library 316 as a JSON document. Once stored, the rate plan document 506 may be available by the rating core 302 for generating a rate quote based on information provided by the rating call 326, as described above.

Through the systems and processes described above, an integrated ratemaking platform is presented that provides an adaptable system for measuring, optimizing, reporting, and implementing rating decisions. Traditional ratemaking systems may comprise several disparate applications operating in various data schemas, adding an inefficiency and cost to the ratemaking process. The integrated ratemaking platform provided herein combines the various legacy ratemaking systems for a measurable, adaptable, continuous pricing, analytics and actuarial services while reducing redundancies, inefficiencies, and cost of the ratemaking systems and processes.

Figure 7:
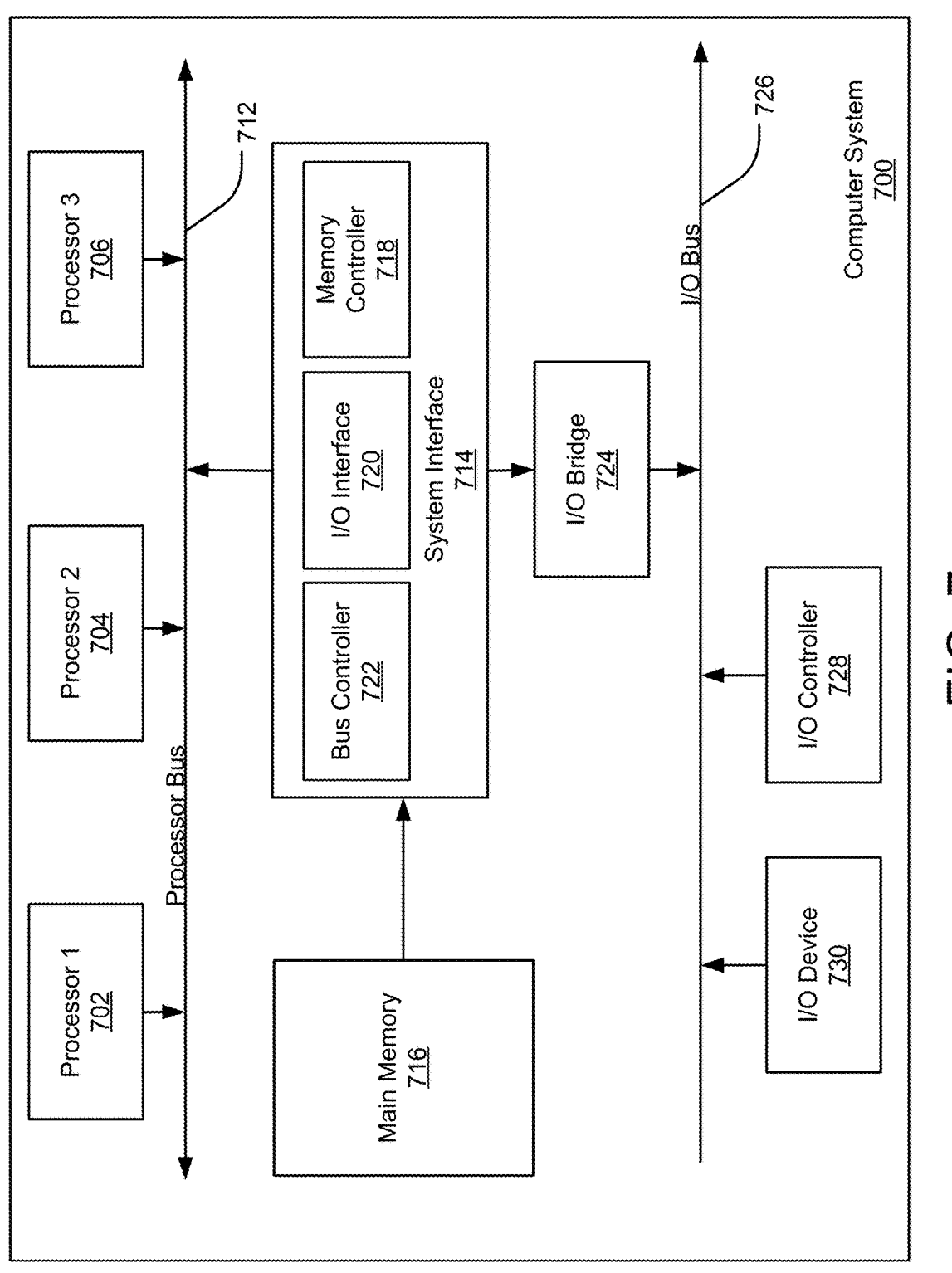
FIG. 7 shows an example computing system that may implement various systems and methods discussed herein in accordance with aspects of the disclosure.

FIG. 7 is a block diagram illustrating an example of a computing device or computer system 700 which may be used in implementing the embodiments of the components of the integrated ratemaking platform 300 disclosed above. For example, the computing system 700 of FIG. 7 may be the controller 308 or the rating core 302 of the integrated ratemaking platform 300 discussed above. The computer system (system) includes one or more processors 702-706.

Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 718 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available through a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 716, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Figure 8:
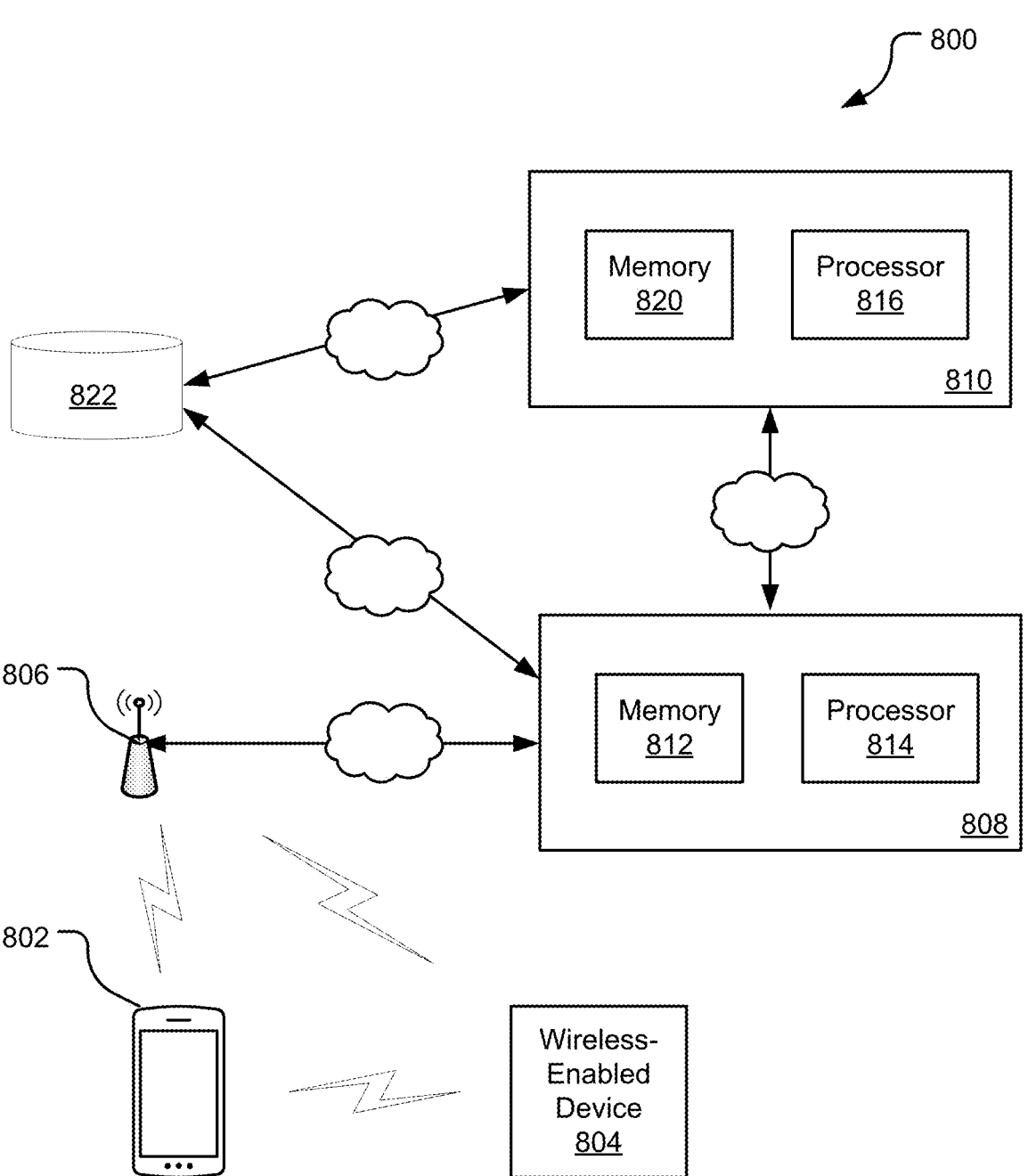
FIG. 8 is network environment for communicating with a integrated ratemaking platform over a wireless network.

In one implementation, the integrated ratemaking platform 300 may be accessible through a mobile or wireless-enabled device. For example, a customer may utilize a mobile device to contact the integrated ratemaking platform 300 to obtain a rate quote and/or provide information included in the rating call. FIG. 8 is network environment 800 for communicating with the integrated ratemaking platform described herein. In some instances, one or more components of the integrated ratemaking platform 300 may communicate over the wireless network 800. For example, the controller 308 of the integrated ratemaking platform 300 may communicate with the rating core 302 or other components or databases through the wireless network. In one particular implementation, a user of wireless-enabled devices 802, 804 may communicate with a wireless access point 806. The wireless-enabled device 802 may be a mobile telephone with applications and other functionality, a hand-held device with Wi-Fi connectivity, a mobile telephone with travel assistance application installed, or other portable electronic device. The wireless-enabled devices 802, 804 may be configured to communicate with a wireless access point 806 such as a cellular tower operated by a cellular service provider. Alternatively, the wireless access point 806 may be a Wi-Fi-enabled hotspot where the wireless-enabled device 802, 804 may obtain access to the Internet (e.g., to communicate using online chat applications or voice-over-IP applications). In yet another example, the wireless-enabled device 804 may be integrated into or otherwise associated with an automobile to communicate over the wireless network or a satellite-based communication system such that the wireless access point 806 may be satellite device. One skilled in the art will appreciate that other techniques may be used to allow devices 802, 804 access over a wide area network (WAN) or any other type of communications or data networks.

The data communicated from the user devices 802, 804 may be transmitted to a server 808. The server 808 or other type of computing device may include a memory 812 storing computer-readable instructions and a processor 814 for executing the computer-readable instructions. The data communicated to the server 808 from the user device 802, 804 may be transmitted over the WAN through wireless access point 806. Meanwhile, another server 810 may be comprised of a memory 820 storing computer-readable instructions and a processor 816 for executing the computer-readable instructions in accordance with aspects of the disclosure. The memories 812, 820 may also store computer data files that hold information that may be useful to applications running on the user's mobile device 802, 804 or the servers 808, 810. For example, the computer data files may include user login/profile information, insurance policy (or motor club) information, service provider list and related information, databases of information for identifying and selecting roadside service providers, and/or other information. The data collected and stored in the data files may be used to support one or more of the numerous features disclosed throughout this disclosure. Both or either first server 808 or another server 810 may store and access data through data store 822, accessible through a network connection.

One skilled in the art will appreciate that the server (e.g., servers 810 and 808) is not limited to a single machine or device. The server may be embodied as a web server or Internet-accessible server. Furthermore, the term server refers to any system of computers and/or devices (e.g., firewalls, routers, caching systems, proxy servers, etc. or combination thereof) that may be used to provide access to services and features available for use. As such, different reference to the server performing particular steps does not require that the same machine/device perform all the steps.

Servers 808, 810, data store 822, and wireless access point 806 may communicate over a wired and/or wireless connection. In some instances, a private, secure connection may be established between one or more of these components. For example, server 808 and server 810 may communicate over a network cloud representing the Internet. Alternatively, server 808 and data store 822 may communicate over a secure WAN or a dedicated T1 (or other telecommunications) line. Furthermore, wireless devices 802, 804 may include a processor, memory, display screen (e.g., touch-screen), keypad, sensors (e.g., motion, light, etc.), camera, global positioning system (GPS) chip, audio output/input devices, and other electronic components configured for use in mobile phones, PDAs, and mini-laptops.

Such a server may operate in a networked environment supporting connections to one or more remote computing devices. The remote computing devices may be personal computing devices or servers that include many or all of the elements described below relative to the server. Remote computing devices may be a mobile device communicating over wireless carrier channel. The network connections depicted in the figures may include a local area network (LAN) and/or a wide area network (WAN), but may also include other networks. When used in a LAN networking environment, the server may be connected to the LAN through a network interface or adapter in the communications module. When used in a WAN networking environment, the server may include a modem in the communications module or other means for establishing communications over the WAN, such as the Internet. Multiple instances of the servers 810, 808 may be located at sites around the world to reduce the transmission distance of communications between the servers and the mobile device 802. It will be appreciated that the network connections shown and described are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various commonly known web browsers can be used to display and manipulate data on web pages. In one implementation, a roadside assistance system for dispatching a roadside assistance vehicle or implement some other type of roadside assistance response to a user associated with a mobile device 802, 804 or a disabled or other type of vehicle may be implemented servers 808, 810. The roadside assistance system is described in greater detail below.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

18

What is claimed is:

1. A ratemaking platform comprising:
a processing device receiving a proposed rating plan comprising one or more parameters for generating a rate quote;
a non-transitory database storing a plurality of rating plans;
a rating engine executing one of the plurality of rating plans with a plurality of rate quote parameters;
wherein the processing device executes one or more instructions that cause the processing device to perform the operations of:
converting the proposed rating plan from a structured data schema comprising interrelated variables arranged in data tables into a plurality of executable instructions, wherein converting comprises:
analyzing the interrelated variables to determine dependencies between variables; and
generating nested rate orders comprising the executable instructions arranged to maintain the dependencies between variables;
automatically certifying the proposed rating plan by:
executing the plurality of executable instructions comprising the nested rate orders and comparing a received output from the rating engine executing the proposed rating plan to a plurality of certification threshold values;
receiving a rating call comprising one or more rate quote variables;
executing, using the one or more rate quote variables, the certified proposed rating plan in the rating engine to generate a rate quote in response to the rating call;
transmitting, over a network connection to a receiving device, the generated rate quote; and
implementing, in response to receiving an acceptance of the generated rate quote, the generated rate quote in a processing system.

2. The ratemaking platform of claim 1, wherein converting the rate plan document further comprises generating a rate plan document comprising the plurality of executable instructions and a rate control document comprising metadata associated with the proposed rating plan.

3. The ratemaking platform of claim 1, wherein the processing device is further caused to perform the operation of:
promoting the converted proposed rating plan to a subscriber service, the subscriber service notifying a rating plan library of the converted proposed rating plan.

4. The ratemaking platform of claim 1, wherein the processing device is further caused to perform the operations of:
receiving a failure notification of the certification of the proposed rating plan, the failure notification comprising an identification of a failed certification threshold value of the plurality of certification values; and
adjusting, using a machine-learning technique, the proposed rating plan in response to the identification of a failed certification threshold value of the plurality of certification values.

5. The ratemaking platform of claim 1, wherein the proposed rating plan is based on one or more inputs to a user interface in communication with the processing device.

6. The ratemaking platform of claim 1, wherein the proposed rating plan is received, at the processing device, from a machine learning algorithm configured to generate a proposed rating plan based on one or more historic rating plans.

7. One or more tangible non-transitory computer-readable storage media storing computer-executable instructions for performing a computer process on a server of a network, the computer process comprising the method of:

receiving, at a processing device, a proposed rating plan comprising one or more parameters for generating a rate quote;

executing, at a ratings engine and utilizing a plurality of rate quote parameters, the proposed rating plan;

converting the proposed rating plan from a structured data schema comprising interrelated variables arranged in data tables into a plurality of executable instructions, wherein converting comprises:

analyzing the interrelated variables to determine dependencies between variables; and generating nested rate orders comprising the executable instructions arranged to maintain the dependencies between variables;

certifying the proposed rating plan by executing the plurality of executable instructions comprising the nested rate orders and comparing a received output from the rating engine executing the proposed rating plan to a plurality of certification threshold values;

receiving a rating call comprising one or more rate quote variables;

executing, by the processing device and using the one or more rate quote variables, the certified proposed rating plan in the rating engine to generate a rate quote in response to the rating call;

transmitting, over a network connection to a receiving device, the generated rate quote; and implementing, in response to receiving an acceptance of the generated rate quote, the generated rate quote in a processing system.

8. The one or more tangible non-transitory computer-readable storage media of claim 7, wherein the proposed rating plan comprises a first data schema, the computer process comprising the additional method of:

converting the proposed rating plan from the first data schema into a plurality of executable instructions, the plurality of executable instructions maintaining an interrelationship of variables of the proposed rating plan.

9. The one or more tangible non-transitory computer-readable storage media of claim 8, wherein converting the proposed rating plan comprises generating a rate plan document comprising the plurality of executable instructions and a rate control document comprising metadata associated with the proposed rating plan.

10. The one or more tangible non-transitory computer-readable storage media of claim 8, the computer process comprising the additional method of:

promoting the converted proposed rating plan to a subscriber service, the subscriber service notifying a rating plan library of the converted proposed rating plan.

11. The one or more tangible non-transitory computer-readable storage media of claim 7, the computer process comprising the additional method of:

receiving a failure notification of the certification of the proposed rating plan, the failure notification comprising an identification of a failed certification threshold value of the plurality of certification values; and adjusting, using a machine-learning technique, the proposed rating plan in response to the identification of a failed certification threshold value of the plurality of certification values.

12. The one or more tangible non-transitory computer-readable storage media of claim 7, wherein the proposed rating plan is based on one or more inputs to a user interface in communication with the processing device.

13. The one or more tangible non-transitory computer-readable storage media of claim 7, wherein the proposed rating plan is received, at the processing device, from a machine learning algorithm configured to generate a proposed rating plan based on one or more historic rating plans.

14. A method for a ratemaking platform, the method comprising:

receiving, at a processing device, a proposed rating plan comprising one or more parameters for generating a rate quote;

executing, at a ratings engine and utilizing a plurality of rate quote parameters, the proposed rating plan;

converting the proposed rating plan from a structured data schema comprising interrelated variables arranged in data tables into a plurality of executable instructions, wherein converting comprises:

analyzing the interrelated variables to determine dependencies between variables; and generating nested rate orders comprising the executable instructions arranged to maintain the dependencies between variables;

certifying the proposed rating plan by executing the plurality of executable instructions comprising the nested rate orders and comparing a received output from the rating engine executing the proposed rating plan to a plurality of certification threshold values;

receiving a rating call comprising one or more rate quote variables;

executing, by the processing device and using the one or more rate quote variables, the certified proposed rating plan in the rating engine to generate a rate quote in response to the rating call;

transmitting, over a network connection to a receiving device, the generated rate quote; and implementing, in response to receiving an acceptance of the generated rate quote, the generated rate quote in a processing system.

15. The method of claim 14, wherein the proposed rating plan comprises a first data schema, the method further comprising:

converting the proposed rating plan from the first data schema into a plurality of executable instructions, the plurality of executable instructions maintaining an interrelationship of variables of the proposed rating plan.

16. The method of claim 15 further comprising:

promoting the converted proposed rating plan to a subscriber service, the subscriber service notifying a rating plan library of the converted proposed rating plan.

17. The method of claim 14 further comprising:

receiving a failure notification of the certification of the proposed rating plan, the failure notification comprising an identification of a failed certification threshold value of the plurality of certification values; and adjusting, using a machine-learning technique, the proposed rating plan in response to the identification of a failed certification threshold value of the plurality of certification values.

18. The ratemaking platform of claim 1, wherein the structured data schema comprises data tables with primary values and associated secondary values.

19. The ratemaking platform of claim 1, wherein generating nested rate orders comprises creating a hierarchical structure of rate orders where execution of one rate order depends on results of another rate order.

20. The ratemaking platform of claim 1, further comprising a unified rating core that performs both analytics rating operations and production rating operations, wherein the rating engine is part of the unified rating core.

\* \* \* \* \*